July 22, 1930. V. COSCIONI 1,771,207
ADJUSTABLE PLANT HOLDER
Filed Sept. 5, 1928
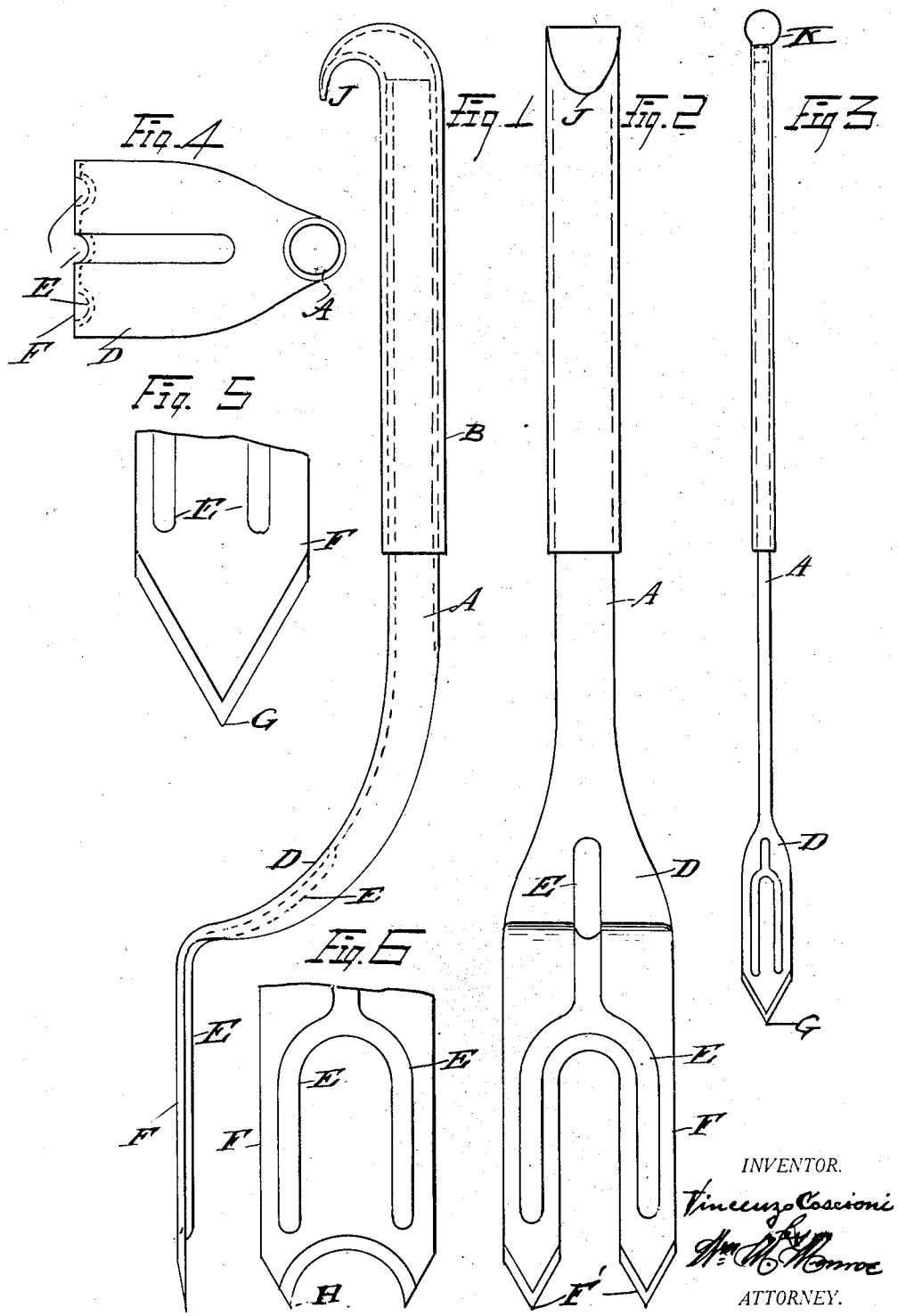
INVENTOR.
Vincenzo Coscioni
ATTORNEY.

Patented July 22, 1930

1,771,207

UNITED STATES PATENT OFFICE

VINCENZO COSCIONI, OF CLEVELAND, OHIO

ADJUSTABLE PLANT HOLDER

Application filed September 5, 1928. Serial No. 304,109.

The objects of the invention are to provide an improvement in plant holders especially adapted to greenhouses, and flower gardens.

The device is constructed simply and efficiently in one piece and preferably of sheet metal so that the devices can be commercially produced and placed upon the market in large quantities at a minimum initial cost.

The device is constructed with a telescoping tubular vertical stem and with a broad flattened earth entering portion or blade that is horizontally offset from the stem portion, so that the cutting edge will not injure the roots of the plants.

This construction also brings the tubular stem into close proximity to the stem or branches of the plant so that they can be readily attached thereto with tape or wire.

The breadth of the blade also gives stability to the holder so that it cannot be readily blown over.

The entering edge of the blade may be forked if desired, to permit it to enter the ground more easily and will not be as apt to cut the roots.

The sheet metal blade is formed by flattening out the extremity of the tube from which the device is constructed, and corrugations may be made longitudinally therein for reinforcement if desired.

The invention is illustrated in the accompanying drawings, hereinafter more fully described and particularly pointed out in the claims.

In the accompanying drawings, Fig. 1 is a side elevation of the device, Fig. 2 is a front elevation of a forked construction, Fig. 3 is a front elevation in reduced scale showing a pointed blade, Fig. 4 is a plan of the offset portion of the device, and Fig. 5 is a front elevation enlarged of the blade shown in Fig. 3. Fig. 6 illustrates a form of blade that can be used for weeding lawns.

In these views A represents a tubular stem preferably split longitudinally to permit spreading the lower end thereof, B is an outer split tube sleeved closely thereover by spring action and extensible to permit adjusting the holder to the height of the stem of the plant.

The blade F is flattened and is connected with the vertical stem by means of the offset shank D so that the stem can be closely applied to the stem of the plant without injury to the roots.

The blade and stem are vertically corrugated at EE to strengthen the blade and angle of junction with the stem.

In Fig. 2 the blade F is forked at F' to further protect the roots of the plant if they extend beyond the stem from the cutting action of the blade.

In Figs. 3 and 5 the blade is pointed at G and the edges sharpened to enable them to enter the ground more easily.

The device is strongly made and in addition to its use as a support for the plant, it can be used as a trowel or implement to dig or loosen the dirt about the plants, or as shown in Fig. 6 the edge may be concaved at H and the tool can be employed as a weeding tool for lawns.

The outer end of the sleeve B may be provided with a hook J for handling or with a knob K as shown in Fig. 3.

Having described the invention what I claim as new and desire to secure by Letters Patent is:

1. In a plant holder a tubular sheet metal stem formed in outer and inner telescoping sections, an integral shank and a blade offset from said inner section, and reinforcing means for said blade.

2. In a plant holder, a longitudinal split tubular sheet metal stem formed in telescoping sections comprising outer and inner portion, the lower extremity of said inner portion being flattened to provide a shank and blade, said shank and blade being offset from said stem.

3. In a plant holder, a longitudinal split tubular sheet metal stem formed in telescoping sections comprising outer and inner portion, the lower extremity of said inner portion being flattened to provide a shank and blade, said shank and blade being offset from said stem, said blade being longitudinally corrugated.

4. In a plant holder telescoping tubular stems comprising outer and inner portions and an integral shank and a blade offset from said inner portion, the lower edge of said blade being provided with a central recess substantially as described.

5. In a plant holder telescoping inner and outer tubular stem portions, an integral shank and blade offset from inner stem portion, the lower end of said blade being forked substantially as described.

In testimony whereof I affix my signature.

VINCENZO COSCIONI.